Nov. 6, 1962  J. B. FINO ETAL  3,062,556
SLEEVE AND SEAL CONSTRUCTION
Filed Aug. 9, 1960

*INVENTORS*
John B. Fino
BY Frank E. Monge

Townsend and Townsend
*attorneys*

United States Patent Office 3,062,556
Patented Nov. 6, 1962

3,062,556
SLEEVE AND SEAL CONSTRUCTION
John B. Fino and Frank E. Monge, Fresno, Calif., assignors to Schenley Industries, Inc., New York, N.Y., a corporation of Delaware
Filed Aug. 9, 1960, Ser. No. 48,466
7 Claims. (Cl. 277—115)

This invention relates to a novel protective sleeve assembly for a shaft. More particularly, it relates to a reversible assembly locked on a shaft to engage a packing gland or bearing and avoid shaft wear.

In the past it has been the practice to employ a sleeve to protect the shaft of a centrifugal pump from being worn by the packing gland of the pump. The conventional practice has been to use a light press fit to hold the sleeve secure to the pump shaft and to prevent leakage between the shaft and the sleeve. In order to have replacement sleeves readily available irrespective of the location of such pumps, sleeves were usually constructed so that only part or one end of the sleeve frictionally contacted the packing gland and they could be reversed. After one end of this unitary sleeve had worn, the sleeve was removed from the shaft, turned around and the other end of the sleeve placed in contacting relation with the packing gland.

The major disadvantages of this prior practice arose during the removal of the unitary sleeve. The removal operation has not been an easy matter. Since the sleeve was made for a press fit, it would frequently seize and gall when an attempt was made to remove it, causing damage to the unused portion of the sleeve and sometimes even damaging the shaft.

It is therefore a principal object of this invention to provide a reversible sleeve construction for protecting a shaft, characterized by the ease in which the sleeve construction may be removed from the shaft without damaging either the sleeve construction or the shaft.

Another object is to provide a sleeve construction for a shaft that prevents leakage between the sleeve and the shaft.

Another object is to provide a means for locking the sleeve construction to the shaft so that it rotates positively with the shaft.

Further objects, features, and advantages of the present invention will be apparent from the reading of the following detailed description of a preferred embodiment of this invention, with reference to the drawing in which.

Figure 1:
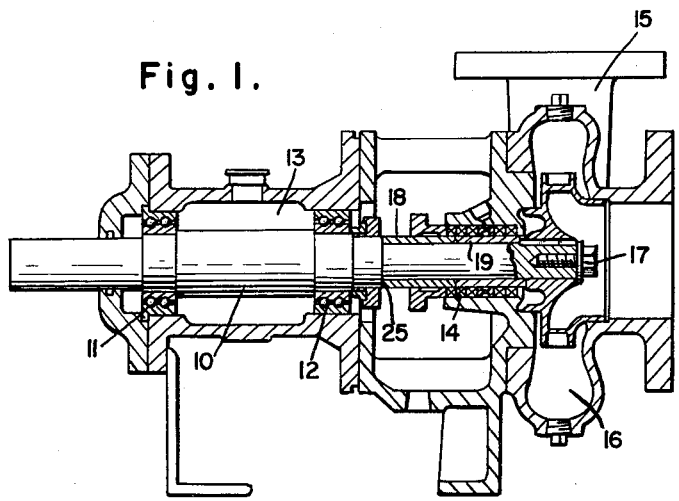
FIG. 1 shows a sectional view of a motor driven centrifugal pump as an illustration of an application embodying this invention.

By reference to the numerals in the drawing, the shaft 10 rotates on the bearings 11, 12 and is supported by the bearing housing generally indicated by 13 and rotated by a motor (not shown). The other end of the shaft 10 is inserted through the packing gland 14 in the pump housing indicated generally by 15. The end of the shaft 10 itself is fixedly connected to the impeller 16 which is also within the pump housing 15. The impeller 16 may be attached to the shaft by a bolt 17. During operation, the motor rotates the shaft 10 which in turn positively rotates the impeller 16. In order to protect the shaft 10 from being worn by frictional engagement with the packing gland 14 through which the shaft 10 is inserted, a pair of similar sleeves 18, 19 are locked in end to end relation on the shaft 10 as hereinafter explained. As a result, when the shaft 10 rotates, the sleeve 19 takes the frictional wear from contact with the packing gland 14.

As shown in the drawing, the adjacent ends of the sleeves 18, 19 have the interior part of their edges 20, 21 beveled and in the illustrated embodiment are held in contacting relation. An O ring 24 is disposed on the shaft 10 between the sleeves 18, 19 in the notch formed by the inner beveled edges 20, 21. Instead of an O ring, any flexible loop or partial loop member may be used provided it is deformable to attain the desired objects of the invention. However, resilient loop members made from such materials as rubber or plastic are preferred.

It will be appreciated by those skilled in the art that this invention should not be construed as relating only to sleeves whose inner adjacent edges are beveled, but is equally applicable to all embodiments wherein the adjacent endes of sleeves 18, 19 are excised or notched, although the illustrative embodiment depicts surfaces lying in planes intersecting radially outward from the shaft 10. Moreover, the beveled edges need not follow a straight line as shown by the beveled edges 20, 21. Any configuration in which the outer edges 22, 23 of the sleeves extend beyond the inner edges 20, 21 will be equally suitable. It has been found, however, that when only the inner edges are beveled as illustrated, exceptionally fine results are achieved. A cut of about 50° from the normal to the sleeve has been found to be quite suitable for purposes of this invention.

As used throughout the specification and claims therefore, the terms beveled or annular should be interpreted as referring to the excised surfaces whether they follow a straight line like 20, 21 in the drawing or are arcuate or irregular in form.

Figure 2:
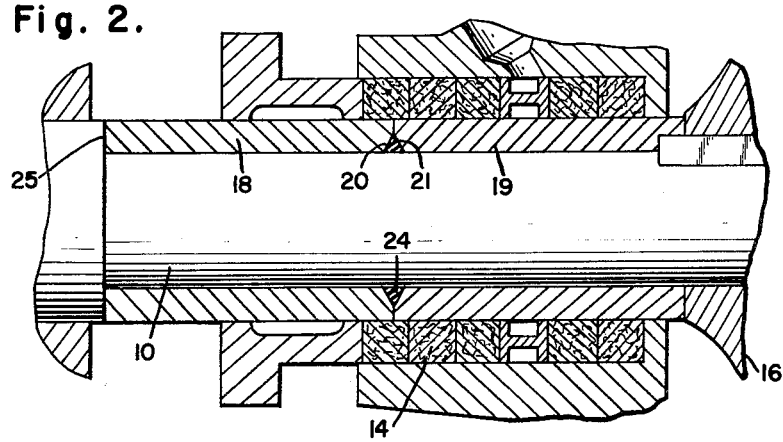
FIG. 2 shows an enlarged portion of FIG. 1 particularly illustrating the present invention in relation to the shaft and the packing gland; and, FIG. 3 is an exploded portion in cross section of the vicinity of the adjacent ends of the two sleeves of the present invention including a portion of the shaft.
Figure 3:
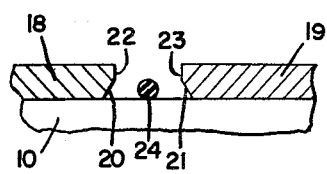

In an assembled position as shown in FIG. 2, the sleeves 18, 19 are urged together at their adjacent edges in abutting relation so that the O ring 24 is deformed between the beveled edges 20, 21 of sleeves 18, 19 and the shaft 10. The sleeves 18, 19 are urged together by the impeller 16 on one side, and a shoulder 25 of the shaft 10 at the other side. The amount of force applied in urging the sleeves 18, 19 together may be made adjustable (by means not shown). It should be noted that the adjacent ends of sleeves 18 and 19 do not have to abut provided the separation is not so great that it interferes with the deformation of the resilient O ring.

The deformed O ring 24 forms a seal and prevents leakage between the shaft 10 and the sleeves 18, 19. In addition, the O ring 24 locks the sleeves 18, 19 to the shaft 10 and thereby causes the sleeves 18, 19 to rotate positively as a unit with the shaft 10 with respect to the packing gland 14.

This novel dual function of the O ring in cooperation with the sleeves results in several highly desirable modifications and advantages over prior art devices. Since the O ring forms a seal and prevents leakage there is no longer any necessity for machining the sleeves for a press fit in order to prevent leaks or lock the sleeves to the shaft. Accordingly, in the preferred embodiment of this invention, the sleeves are made for a loose fit on the shaft. When so designed, the sleeves may be readily removed from the shaft when worn without damaging the sleeves or the shaft. Since only the sleeve principally in contact with the packing gland, i.e. sleeve 19, will be badly worn after use, the two sleeves need only be reversed to obtain additional efficient service from the pump.

The fact that the present invention permits the use of loose fitting sleeves with liberal tolerances on the shaft has another important advantage. Because of these loose tolerances, the sleeves utilized in the foregoing embodiment can be mass produced for many different pumps without encountering difficulty as a fit.

What is claimed is:

1. A seal and sleeve construction for a shaft which comprises in combination, a shaft, two sleeves disposed on said shaft in end to end relation, the adjacent ends of said sleeves having beveled surfaces lying in planes intersecting radially outward from said shaft, a flexible annular ring disposed on said shaft between the beveled surfaces of said sleeves, and means for applying a force to said sleeves to urge them together, whereby said annular ring is deformed between the shaft and the beveled surfaces of the sleeves to form a seal therebetween, and to lock the sleeves to the shaft.

2. A seal and sleeve construction for a shaft in accordance with claim 1 wherein the sleeves are freely slidable along said shaft so that the sleeves are easily removed from the shaft when said force is interrupted.

3. A seal and sleeve construction for a shaft in accordance with claim 1 wherein only the interior edges of the adjacent ends of said sleeves are beveled.

4. In a motor driven pump assembly of the type having a protective sleeve covered shaft engaging the packing gland of the pump, the combination which comprises a shaft, a pair of loose fitting sleeves disposed end to end on said shaft to facilitate their ready removal from the shaft, the adjacent ends of said sleeves having beveled inner edges, a resilient loop member disposed on said shaft between said beveled surfaces, and means cooperating with said shaft to hold the adjacent edges of said sleeves in abutting relation whereby the resilient loop member is deformed between the sleeves and the shaft to lock the sleeves and the shaft for unitary movement with respect to the packing gland and to form a seal between the sleeves and the shaft.

5. A reversible sleeve assembly providing a bearing surface for a rotating shaft comprising a pair of sleeves supported on the shaft in end to end relation, means to urge the sleeves toward each other, and deformable means cooperating with the adjacent ends of the sleeves to hold the sleeves and the shaft in fixed sealed relation.

6. A protective sleeve assembly adapted for fixed support on a rotating shaft to engage a packing gland concentrically disposed at one end of the assembly, said sleeve assembly comprising two identical sleeves slidably disposed on the shaft in end to end relation whereby one sleeve engages the packing gland, the facing ends of said sleeves excised to form a joint annulus interior of the sleeves, a sealing member disposed in said annulus, and means to place said sleeves in compression along the shaft axis so that said member is deformed between the surfaces defining the annulus and the shaft to lock and seal the sleeves and the shaft.

7. A protective sleeve assembly in accordance with claim 6 wherein said sealing member is resilient to permit reversal of the sleeves when the compressive means is interrupted.

References Cited in the file of this patent

UNITED STATES PATENTS

| 1,850,683 | Merrill | Mar. 22, 1932 |
| 2,223,519 | Hornschuch | Dec. 3, 1940 |
| 2,259,422 | Karlberg | Oct. 14, 1941 |
| 2,293,505 | Hillier | Aug. 18, 1942 |

FOREIGN PATENTS

| 719,222 | Great Britain | Dec. 1, 1954 |